United States Patent
Ishida et al.

(10) Patent No.: US 6,691,908 B2
(45) Date of Patent: Feb. 17, 2004

(54) BRAZING APPARATUS AND BRAZING METHOD IN WHICH THE AMOUNT OF HEATING IS CONTROLLED ON THE BASIS OF TEMPERATURE OF ARTICLES TO BE BRAZED

(75) Inventors: Kazutaka Ishida, Osaka (JP); Mitsuo Takahashi, Osaka (JP)

(73) Assignee: Daishin Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 09/907,897

(22) Filed: Jul. 18, 2001

(65) Prior Publication Data

US 2002/0084309 A1 Jul. 4, 2002

(30) Foreign Application Priority Data

Aug. 3, 2000 (JP) .......................................... 2000-23547

(51) Int. Cl.$^7$ .......................... B23K 13/08; B23K 5/22; B23Q 15/00
(52) U.S. Cl. ................................ 228/8; 228/9; 228/56.5
(58) Field of Search ................................ 228/102, 232, 228/234.1, 8, 9, 47.1, 56.5

(56) References Cited

U.S. PATENT DOCUMENTS

| | | | | |
|---|---|---|---|---|
| 3,989,180 A | * | 11/1976 | Tardoskegyi | 228/180.1 |
| 4,465,219 A | * | 8/1984 | Kondo | 228/37 |
| 4,540,114 A | * | 9/1985 | Pachschwoll | 228/37 |
| 4,771,929 A | * | 9/1988 | Bahr et al. | 228/102 |
| 5,096,110 A | * | 3/1992 | Schmatz et al. | 228/102 |
| 5,238,171 A | * | 8/1993 | Takahashi | 228/102 |
| 5,271,545 A | * | 12/1993 | Boswell et al. | 228/183 |
| 5,370,531 A | * | 12/1994 | Tsurumi et al. | 432/242 |
| 5,443,382 A | * | 8/1995 | Tsurumi et al. | 432/59 |
| 5,462,216 A | * | 10/1995 | Nishimura | 228/47.1 |
| 5,562,243 A | * | 10/1996 | Marcantonio | 228/8 |
| 5,797,539 A | * | 8/1998 | Wilde et al. | 228/180.1 |
| 5,882,720 A | * | 3/1999 | Legault et al. | 427/8 |
| 5,971,249 A | * | 10/1999 | Berkin | 228/102 |
| 6,036,083 A | * | 3/2000 | Luo et al. | 228/183 |
| 6,129,258 A | * | 10/2000 | Boswell et al. | 219/388 |
| 6,135,344 A | * | 10/2000 | Sakuyama et al. | 228/234.1 |
| 6,206,265 B1 | * | 3/2001 | Yamaoka | 228/102 |
| 6,345,757 B1 | * | 2/2002 | Sakuyama et al. | 228/102 |

FOREIGN PATENT DOCUMENTS

| | | |
|---|---|---|
| EP | 1 177 849 A1 | 2/2002 |
| GB | 2 078 585 A * | 1/1982 |
| JP | 63-072477 | 4/1988 |
| JP | 63-084761 | 4/1988 |
| JP | 01-300188 | 4/1989 |

* cited by examiner

*Primary Examiner*—Tom Dunn
*Assistant Examiner*—Colleen P. Cooke
(74) *Attorney, Agent, or Firm*—Rabin & Berdo, P.C.

(57) ABSTRACT

Articles to be brazed are preheated to an increased temperature in a preheating process and the temperature of the articles to be brazed is measured. Conversion data obtained and stored for different combinations of articles to be brazed is referred to on the basis of the measured temperature and a time for which brazing filler metal supply nozzles are kept in a wait state is set on the basis of the conversion data to define the timing for supplying the brazing filler metal wires (S40). A heating burner moves forward and then a timer starts counting the time for which the nozzles are kept in the wait state (S42). When the nozzle wait timer has counted the set time and expired, the brazing filler metal supply nozzles move forward and supply the wires to braze the articles (S43 to 45). In this way, the articles to be brazed, heated by the heating burner, are at an increased temperature suitable for brazing at the time when the brazing filler metal wires are supplied.

6 Claims, 9 Drawing Sheets

BRAZING APPARATUS AND BRAZING METHOD IN WHICH THE AMOUNT OF HEATING IS CONTROLLED ON THE BASIS OF TEMPERATURE OF ARTICLES TO BE BRAZED

BACKGROUND OF THE INVENTION

1. Field of the Invention

The present invention relates to a brazing apparatus, and particularly to a brazing apparatus capable of controlling temperature factors which influence the quality of brazing.

2. Description of the Background Art

FIG. 8 is a side view schematically showing a heating and brazing filler metal supply station in a conventional automatic brazing apparatus and FIG. 9 is a plan view of the automatic brazing apparatus shown in FIG. 8. Referring to these diagrams, the automatic brazing apparatus comprises a brazing jig unit A for clamping and accurately positioning articles to be joined together, a preheating burner unit B, a heating and brazing filler metal supply unit C, and a brazing filler metal wire and combustion gas supply unit D.

In the brazing jig unit A, a driving motor 38 and an index gear 37 are fixed under a brazing apparatus fixing table 51; the driving motor 38 is for intermittently driving an index table 36 and the index gear 37 is connected to the driving shaft of the driving motor 38 to accurately position the index table 36. An air pipe 73 for supplying compressed air to a driving source for driving the jig clamp etc. is vertically fixed in the center of the index table 36 provided on the jig table. The air pipe 73 is rotatably connected to the index table 36 through seal rings 35, with O-ring seals fitted around the air pipe 73.

A jig 75 for coaxially clamping articles 71 and 72 to be joined together is disposed on the index table 36. The preheating burner unit B includes a preheating burner 39 which can move forward and backward toward and away from the center of the index table 36. In the heating and brazing filler metal supply unit C, a driving cylinder 48, fixed on the brazing apparatus fixing table 51, and a brazing unit frame 47 are coupled together, and the brazing unit frame 47 is disposed on a pair of guide rails 76 so that it can move forward and backward toward and away from the center of the index table 36.

A forked gas nozzle 43 having two prongs as a burner 42, is connected to a gas pipe 77 and attached to the moving frame 50 to protrude toward the index table 36. Plural pairs of heating torches 69 are attached to the prongs of the gas nozzle 43, each pair of heating torches 69 facing toward each other. Nozzle driving cylinders 45 are attached to a mount fitting 59 on the brazing unit frame 47 in such a manner that they can be adjusted for angle. Brazing filler metal supply nozzles 44 are attached to the nozzle driving cylinders 45, with their tips aimed at the central point of the pieces heated by the heating torches 69.

In the brazing filler metal and combustion gas supply unit D, the nozzle driving cylinders (brazing filler metal wire cylinders) 45 are driven to move the brazing filler metal supply nozzles 44 toward the brazed portion of the articles 71 and 72 to be joined. Then given amounts of brazing filler metal wires are fed by a wire supply motor 52 from brazing filler metal wire reels 58a and 58b. A mixture of combustible gas and burning-supporting gas (oxygen) mixed in a given ratio is supplied as the combustion gas.

Next, the brazing operation is briefly described referring to FIGS. 8 and 9.

First, the articles 71 and 72 to be brazed together are introduced and held by the jig 75, and then the index table 36 rotates 90°, clockwise in FIG. 9, to bring them to the stage of the preheating burner unit B. Then the preheating burner 39 moves forward to locate its prongs around the articles 71 and 72 and the preheating burner 39 preheats them. After preheating, the preheating burner 39 moves backward, and the index table 36 further rotates 90° clockwise to bring the preheated articles 71 and 72 to the stage of the heating and brazing filler metal supply unit C. Then the gas nozzle 43 is moved forward in given timing and starts heating the joined portion of the articles 71 and 72 with "high" flames.

The brazing filler metal supply nozzles 44 start moving forward somewhat after the gas nozzle 43 has began heating. Further later, the brazing filler metal wires 46 are supplied from the brazing filler metal supply nozzles 44 in given timing to the joined portion of the articles 71 and 72 and then brazing is performed. The gas nozzle 43 heats the joined portion for a given time period, and then the flames are changed from "high" to "low," and the burner 42 retreats when the low flame period ends. The brazing operation thus ends. The brazing filler metal supply nozzles 44 are withdrawn around when the flames of the gas nozzle 43 are changed from "high" to "low."

After brazing, the index table 36 further rotates 90° and the joined articles 71 and 72 are taken out as a brazed product. As explained so far, a set of articles to be brazed together are introduced each time the index table 36 rotates 90° and are brazed through the preheating, brazing, and exit stages. In practice, a plurality of sets of articles to be brazed are sequentially introduced each time the index table 36 rotates 90° and are brazed in parallel through the stages.

The conventional brazing apparatus shown above encounters no particular problem when the temperature of the articles introduced to be brazed and the temperature in the atmosphere stay constant. However, inferior brazing may be caused when such temperatures vary at changes of the season, or vary when the operation is started at the beginning of the working hours, during the operation, or when the operation is restarted after interruption. That is to say, when the articles to be brazed are heated with a constant amount of heating in the preheating and heating processes, variations of such conditions cause the articles to attain varied temperatures during brazing, which would result in unstable brazing quality.

Even if the amount of preheating and the amount of heating can be varied to control the heating depending on the articles to be brazed, it is still difficult to keep the temperature rise of the articles constant since accurate information for controlling the amounts of heating is not available.

Further, even if a system for controlling the amounts of heating has been experientially established about one combination of articles to be brazed together (one combination of articles of certain shapes and certain materials), a different combination of articles will be heated to a different temperature, which would also result in inferior brazing quality.

SUMMARY OF THE INVENTION

An object of the present invention is to provide a brazing apparatus and a brazing method in which the brazing quality is not influenced by temperature conditions of the articles to be brazed etc.

To achieve the object shown above, a brazing apparatus according to a first aspect of the present invention comprises: preheating means for preheating articles to be brazed; detecting means for detecting the temperature of the preheated articles to be brazed; heating means for heating the preheated articles to be brazed; control means for controlling the heating means to heat the preheated articles to be brazed to a prescribed temperature on the basis of the detected temperature; and brazing means for brazing the articles to be brazed which have reached the prescribed temperature.

With this structure, the heating means is controlled on the basis of the temperature of the articles measured before they are heated by the heating means.

According to a brazing apparatus of a second aspect of the present invention, in the structure of the first aspect, the control means comprises calculating means for calculating the amount of heating required to heat the articles to be brazed to the prescribed temperature on the basis of their temperature, the calculating means calculating the amount of heating on the basis of conversion data obtained about each of different combinations of articles of different shapes or different materials, and wherein the control means controls the heating means on the basis of the calculated amount of heating.

With this structure, an appropriate amount of heating can be calculated for each combination of articles to be brazed.

According to a brazing apparatus of a third aspect of the present invention, in the structure of the second aspect the conversion data is obtained through a test operation comprising preparing a plurality of sets of articles to be brazed, all of the plurality of sets corresponding to the same combination comprising a first article of a first shape and a first material and a second article of a second shape and a second material, sequentially preheating the plurality of sets of articles to be brazed with the preheating means to different temperatures, detecting the respective temperatures with the detecting means, measuring heating times required to heat the plurality of sets of articles to be brazed with the heating means to the prescribed temperature from the respective temperatures attained by the preheating, and obtaining the data defined by the detected temperatures and the corresponding heating times as the conversion data, and in normal operation, the calculating means calculates the amount of heating from the detected temperature of the articles to be brazed on the basis of corresponding the conversion data.

With this structure, the conversion data can be defined by using the same articles as those which are brazed in actual practice.

According to a brazing apparatus of a fourth aspect of the present invention, in the structure of the third aspect, the conversion data comprises an approximate expression or a conversion table.

With this structure, the amount of heating can be efficiently calculated.

According to a fifth aspect of the present invention, a brazing method comprises the steps of: detecting the temperature of articles to be brazed; heating the articles to be brazed to a prescribed temperature on the basis of the detected temperature; and brazing the heated articles to be brazed.

With this structure, the articles to be brazed are heated on the basis of their temperature measured before they are heated.

According to a sixth aspect of the present invention, a brazing method comprises the steps of: preheating articles to be brazed; detecting the temperature of the preheated articles to be brazed; heating the preheated articles to be brazed to a prescribed temperature on the basis of the detected temperature; and brazing the heated articles to be brazed.

With this structure, the articles to be brazed are heated on the basis of their temperature increased by the preheating and measured prior to the heating.

As shown above, according to the brazing apparatus of the first aspect of the present invention, the heating means is controlled on the basis of the temperature of the articles measured before they are heated, so that the articles to be brazed can be heated accurately to the given temperature to enhance the brazing quality.

According to the brazing apparatus of the second aspect of the present invention, in addition to the effect of the first aspect, the amount of heating can be calculated appropriately for each combination of articles to be brazed, so that the heating means can be controlled stably.

According to the brazing apparatus of the third aspect of the present invention, in addition to the effect of the second aspect, the conversion data is obtained by using the same articles as those brazed in actual practice, so that the articles to be brazed can be accurately heated to the prescribed temperature in normal operation. The brazing quality is therefore not deteriorated even if the articles to be brazed are at different temperatures before heated.

According to the brazing apparatus of the fourth aspect of the present invention, in addition to the effect of the third aspect, the amount of heating can be efficiently calculated, which contributes to automation of the brazing apparatus.

According to the brazing method of the fifth aspect of the invention, the articles to be brazed can be accurately heated on the basis of their temperature measured before they are heated, which enhances the brazing quality.

According to the brazing method of the sixth aspect of the invention, the articles to be brazed can be accurately heated on the basis of their temperature raised by the preheating and measured before the heating, so as to enhance the brazing quality.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
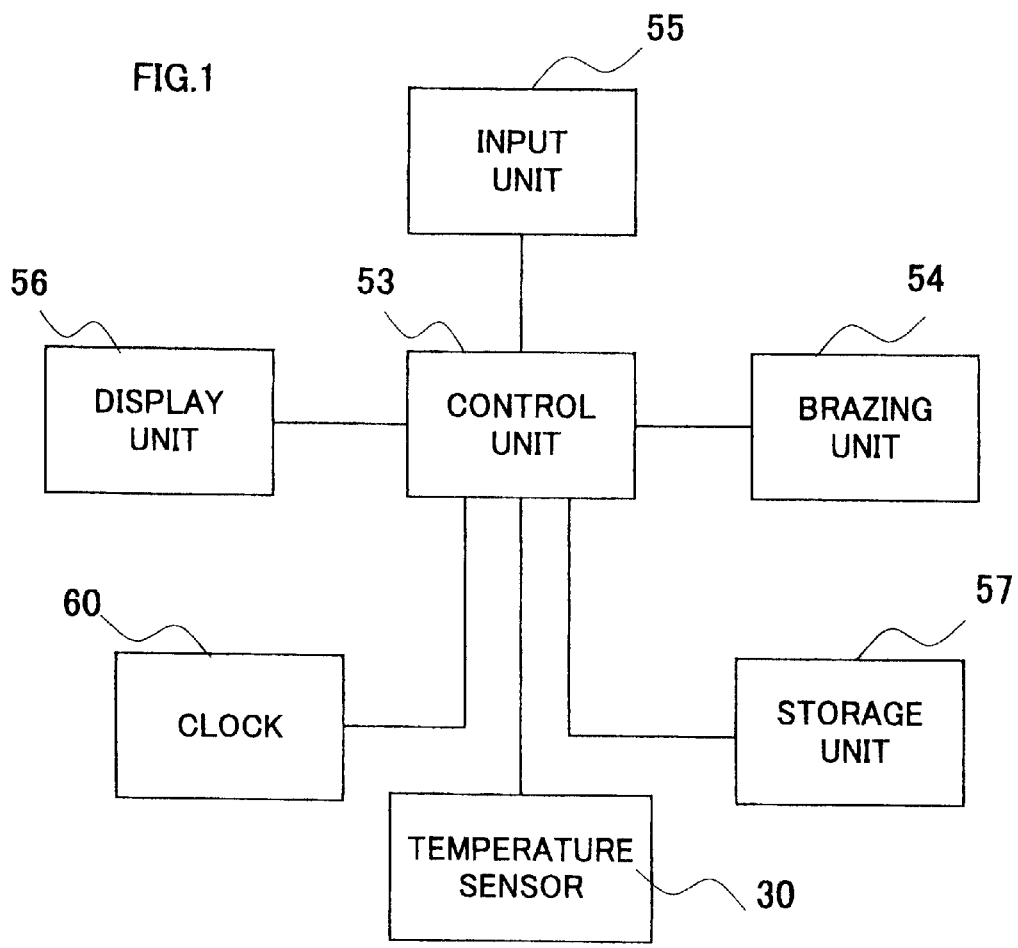
FIG. 1 is a block diagram showing a structure for controlling a brazing apparatus according to a first embodiment of the present invention.

FIG. 1 is a block diagram showing the structure of a brazing apparatus according to a first embodiment of the present invention.

Referring to FIG. 1, this brazing apparatus includes a control unit 53 as its major component. The brazing apparatus further comprises a brazing unit 54 controlled by the control unit 53, a temperature sensor 30 for measuring the temperature of articles to be brazed together, an input unit 55 for accepting a timing input at the time when the articles to be brazed have reached a given temperature through heating, a display unit 56 for displaying the timing input entered through the input unit 55, a clock 60 serving as a basis for counting the time passage of the timing input from the input unit 55, and a storage unit 57 for storing measurement data provided from the temperature sensor 30 and various data entered through the input unit 55.

Figure 2:
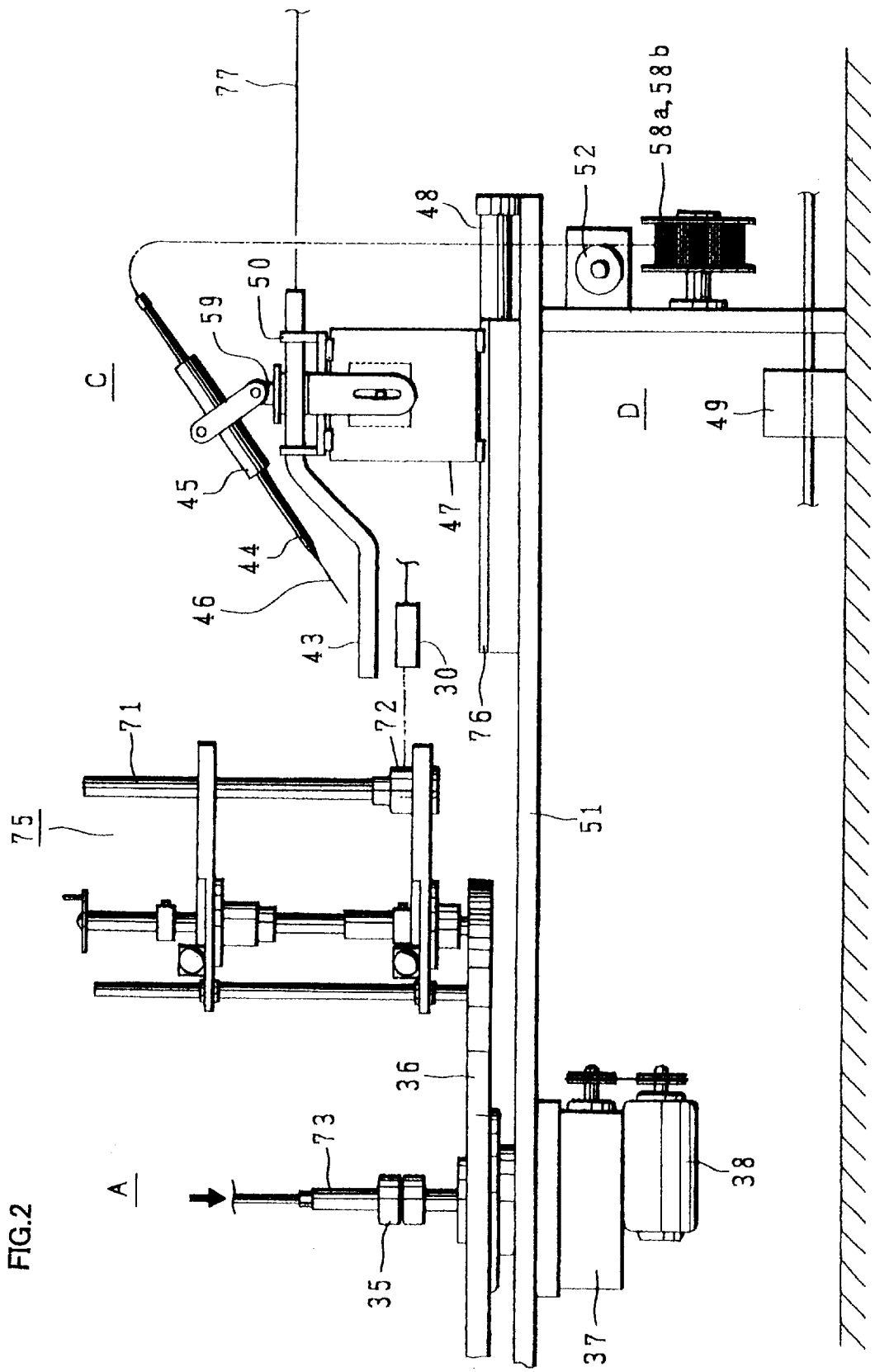
FIG. 2 is a side view showing the brazing apparatus of the first embodiment of the invention.
Figure 3:
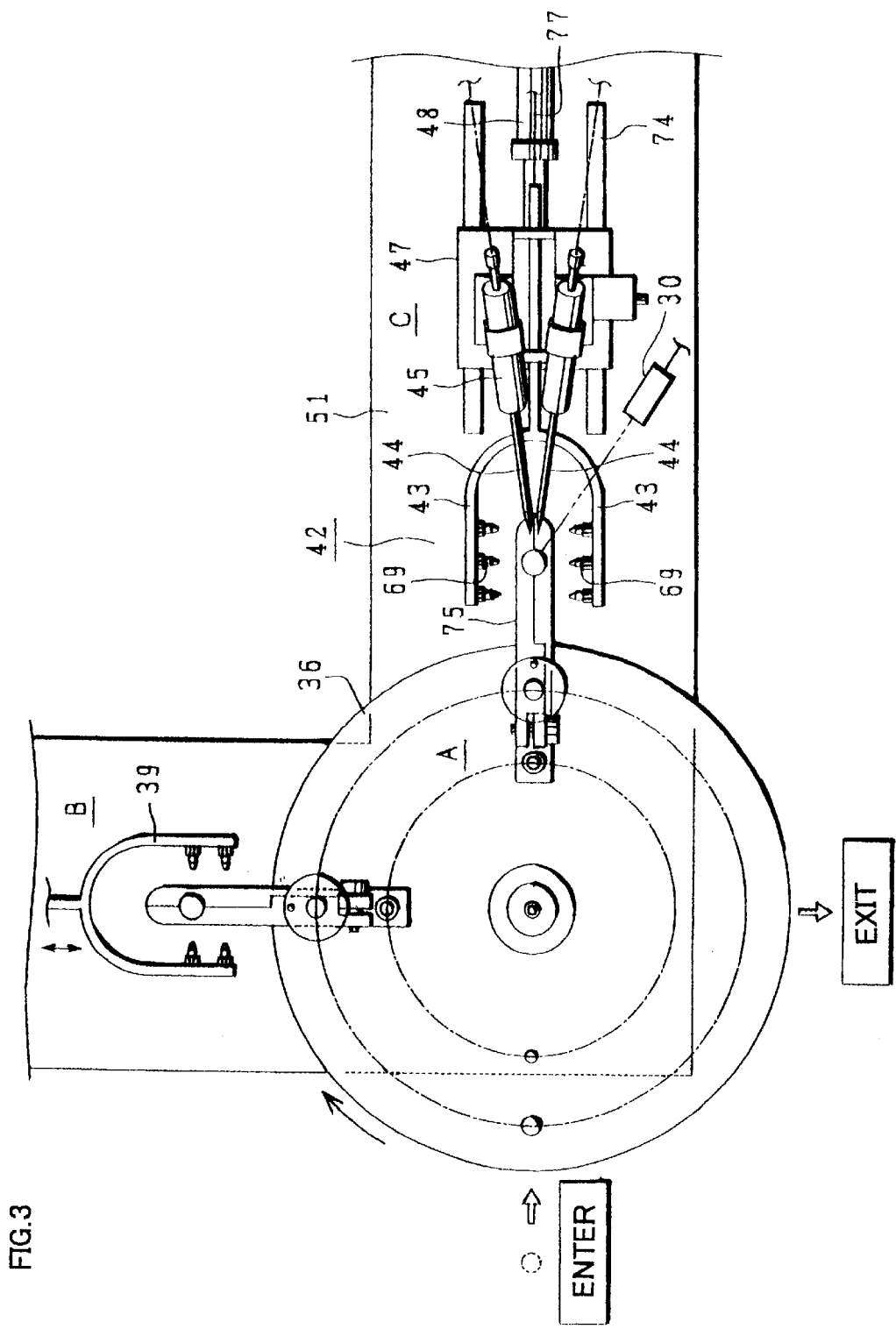
FIG. 3 is a plan view of the brazing apparatus shown in FIG. 2.
Figure 8:
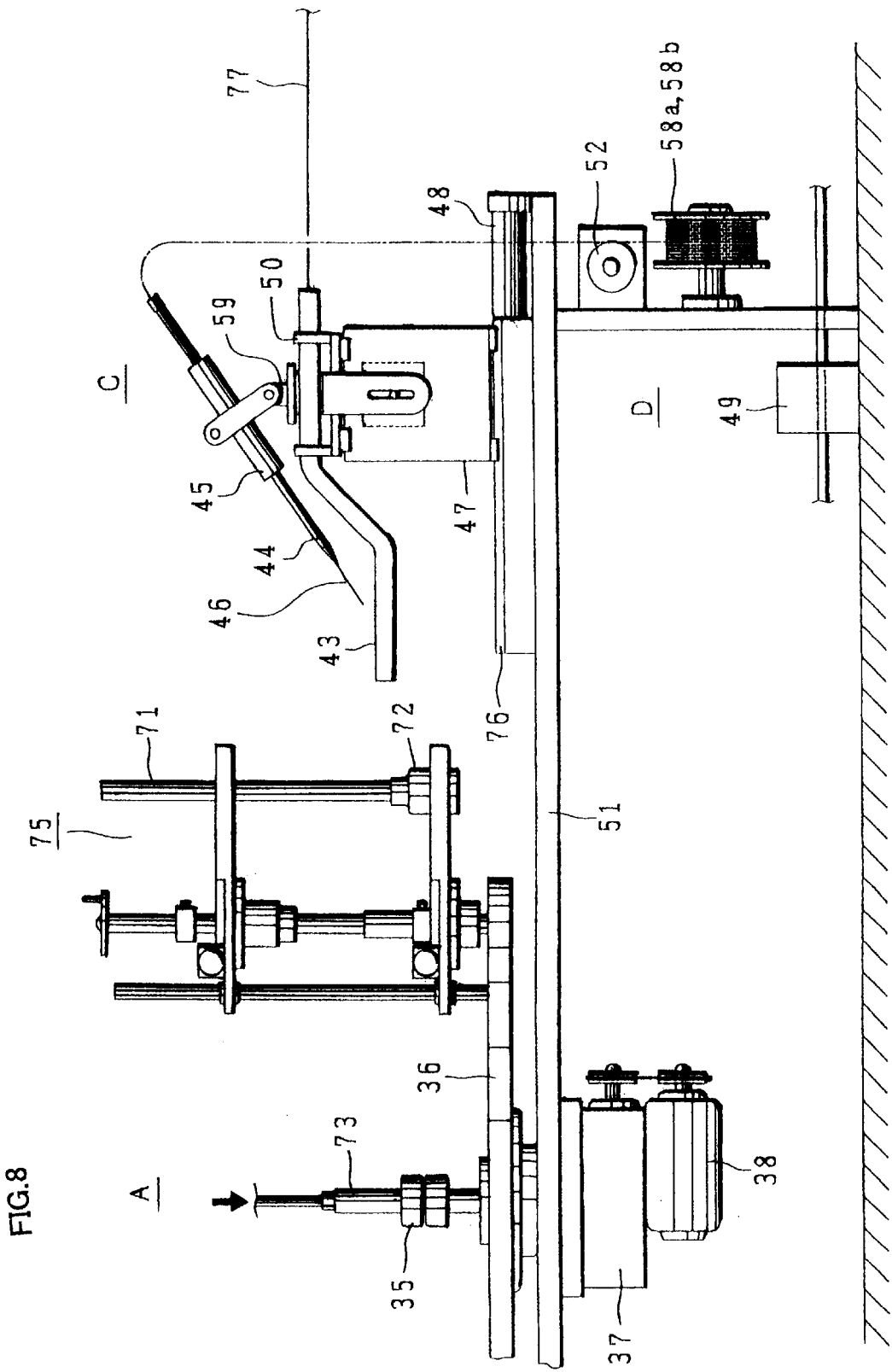
FIG. 8 is a side view showing a conventional brazing apparatus.
Figure 9:
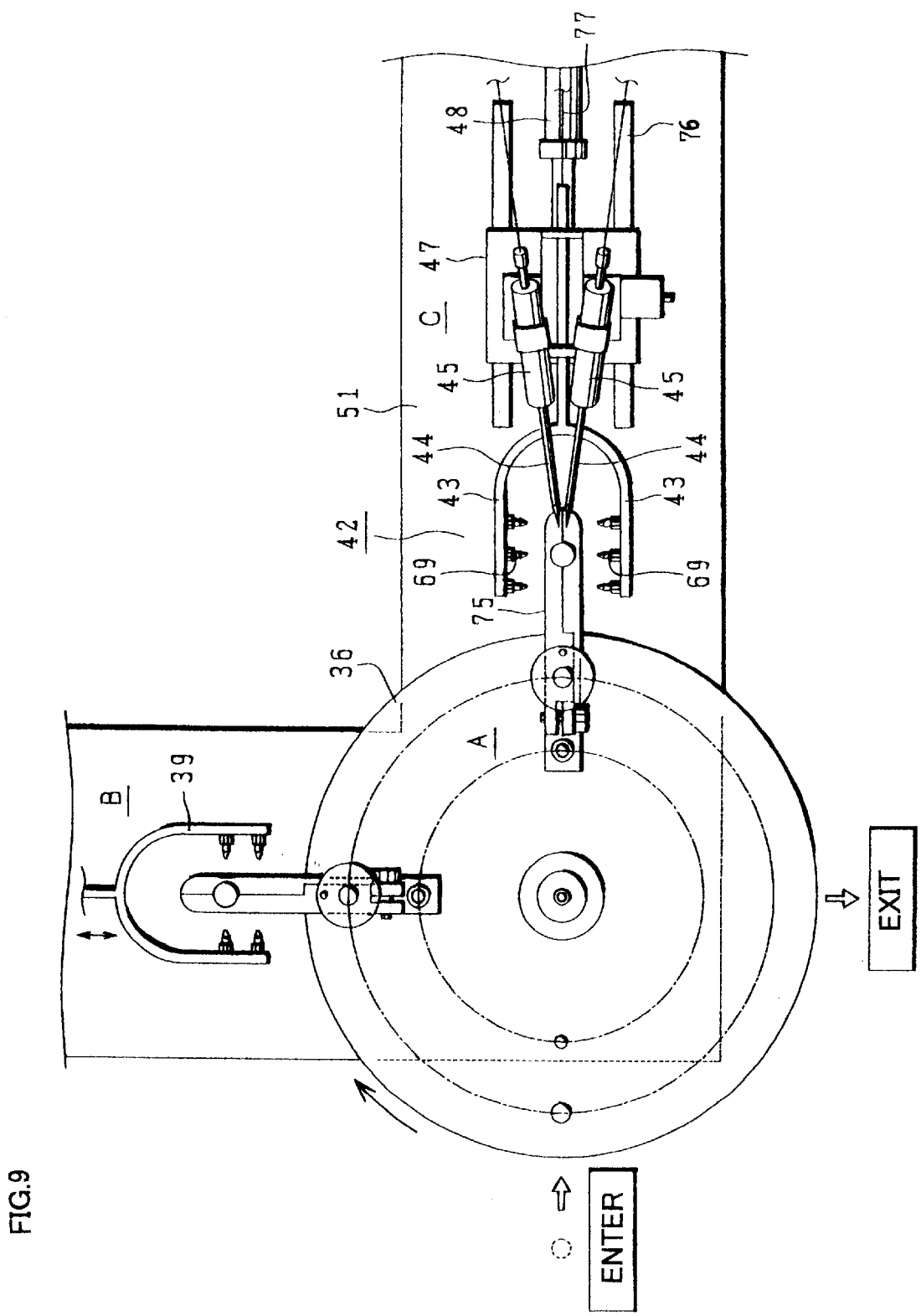
FIG. 9 is a plan view of the brazing apparatus shown in FIG. 8.

More specifically, the control unit 53 contains a CPU as its major component and the brazing unit 54 corresponds to the brazing apparatus shown in FIGS. 8 and 9 in the conventional example. As shown in FIGS. 2 and 3, the brazing apparatus of this embodiment comprises the temperature sensor 30 for measuring the temperature of the articles 71 and 72 to be brazed together. Examples of the temperature sensor 30 include a radiation thermometer, contact thermometer, etc. The input unit 55 corresponds to a remote operation switch in this embodiment. The timing for operating this switch will be described later.

The display unit 56 may be a display screen of a liquid crystal panel, for example, which provides display so that the operator can sequentially check the timing inputs about individual sets of articles entered through the input unit 55. The storage unit 57 is preferably a storage in which data can be easily rewritten and held, such as a DRAM, a magnetic disk, a hard disk, etc.

FIG. 2 is a side view schematically showing the heating and brazing filler metal supply station in the automatic brazing apparatus according to the first embodiment of the present invention and FIG. 3 is a plan view of the automatic brazing apparatus shown in FIG. 2.

While these diagrams correspond to FIGS. 8 and 9 shown in the conventional example, the heating and brazing filler metal supply unit C of this embodiment comprises the temperature sensor 30 for measuring the temperature of the articles 71 and 72 to be brazed. In other respects, the structure is the same as that shown in the conventional example and therefore not described again here.

Next, a test operation for collecting control data with the brazing apparatus of the first embodiment is described.

Figure 4:
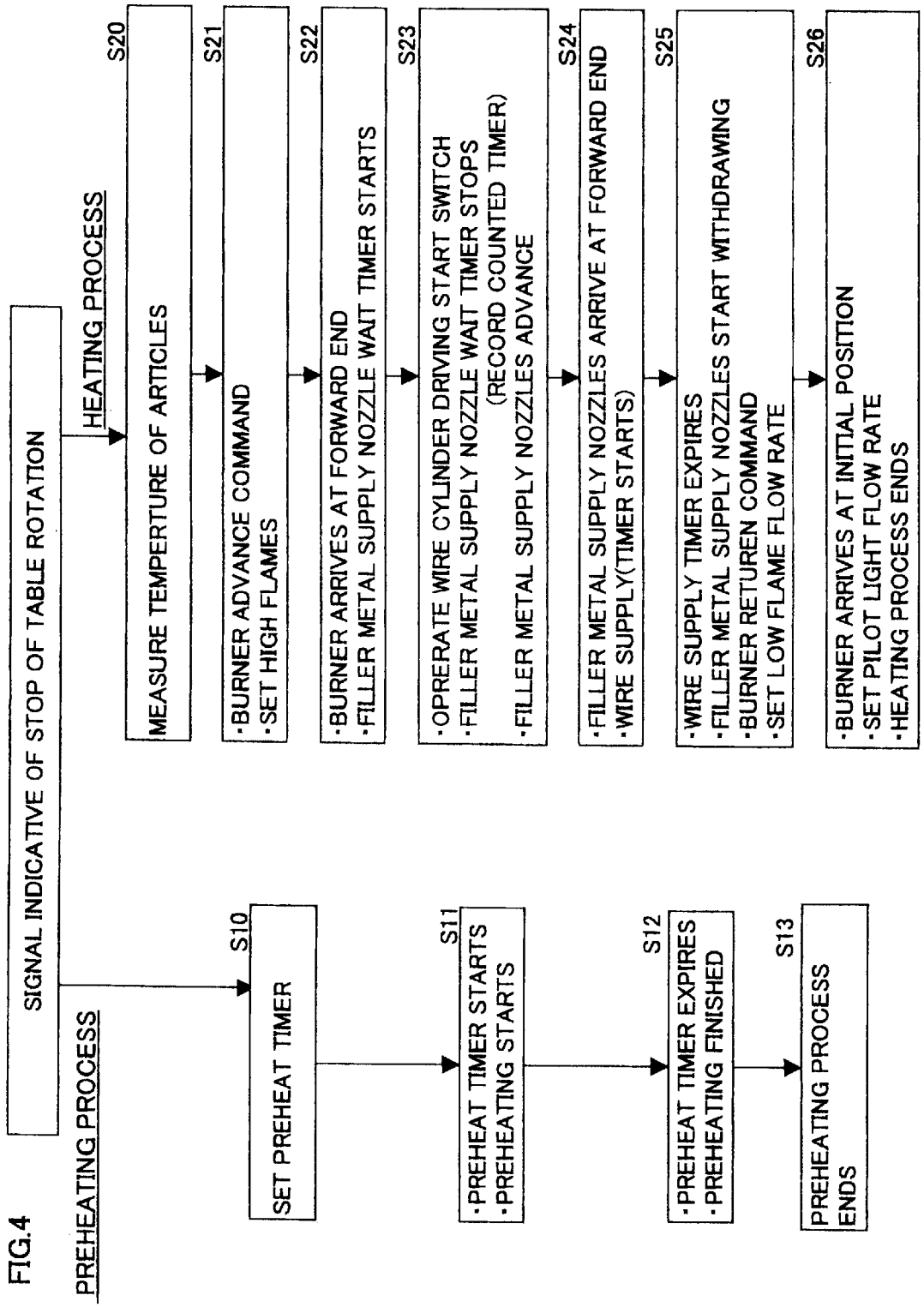
FIG. 4 is a flowchart showing the process of test operation with the brazing apparatus of the first embodiment of the invention.

FIG. 4 is a flowchart showing the process of the test operation.

Referring to this diagram, the preheating process is explained first.

The articles 71 and 72 to be brazed are introduced and clamped in the jig 75 and then the index table 36 rotates and stops at the preheating burner unit B. In response to a signal indicating that the rotation of the table has stopped, a preheating timer is set in the step S10. As will be explained later, the preheating timer can set a plurality of times for a plurality of sets of articles of the same combination of shapes and materials.

Next, in the step S11, the preheating timer starts and the preheating is started. When the preheating timer expires, the preheating is finished (S12). The preheating process thus ends (S13). While the temperature of the articles to be brazed rises in this process, the articles can be heated to different temperatures by setting the preheating timer for different times.

Then the index table 36 rotates to move the workpieces 71 and 72, or the articles preheated to a raised temperature, to the heating and brazing filler metal supply unit C. In response to a signal indicating that the rotation of the table has stopped, the heating process starts, where, first, the temperature of the workpieces preheated to the raised temperature is measured in the step S20. The measured temperature is stored in the storage unit 57 for each set of workpieces.

Next, in the step S21, a command is provided to the heating burner to direct it to move forward, and the burner is set to "high" flames (S21). When the heating burner has arrived at the forward end, a filler metal supply nozzle wait timer is started to count the time for which the nozzles for supplying the brazing filler metal wires are kept in a standby state before their movement is started (S22).

Next, in the step S23, while the articles to be brazed are being heated by the heating burner, the operator monitors the change of their surface conditions and judges that they have reached a temperature suitable for brazing according to the variation of their surface conditions, and then the operator operates a switch through the input unit 55 to provide a command to start driving the wire cylinders to move the brazing filler metal supply nozzles forward. This causes the aforementioned filler metal supply nozzle wait timer to stop to define the timing for initiating the forward movement of the brazing filler metal supply nozzles. That is to say, the counted time provided by the timer at this point is stored in the storage unit 57. Then the brazing filler metal supply nozzles are moved forward.

When the brazing filler metal supply nozzles have arrived at the forward end, the brazing filer metal wires are supplied. At this point of time, a wire supply time defining timer starts so as to define the time for which the wires are supplied (S24). Next, when this timer expires, the brazing filler metal supply nozzles start withdrawing. The heating burner is changed from "high" to "low" flames and then directed to return to the initial position (S25).

When the burner has returned to the initial position, the burner is changed to pilot light, and the heating process thus is finished (S26).

In the test operation, the above-described preheating and heating processes are applied to a plurality of sets of articles all corresponding to the same combination of shapes and materials. (For example, when collecting control data about the aforementioned articles 71 and 72 to be brazed, a plurality of pairs of articles 71 and 72, each composed of one article 71 and one article 72, are prepared for the test operation.) This test operation thus provides conversion data contained in calculating means for calculating the amount of heating required to heat the articles to a prescribed temperature on the basis of their temperature measured before heating.

Figure 5:
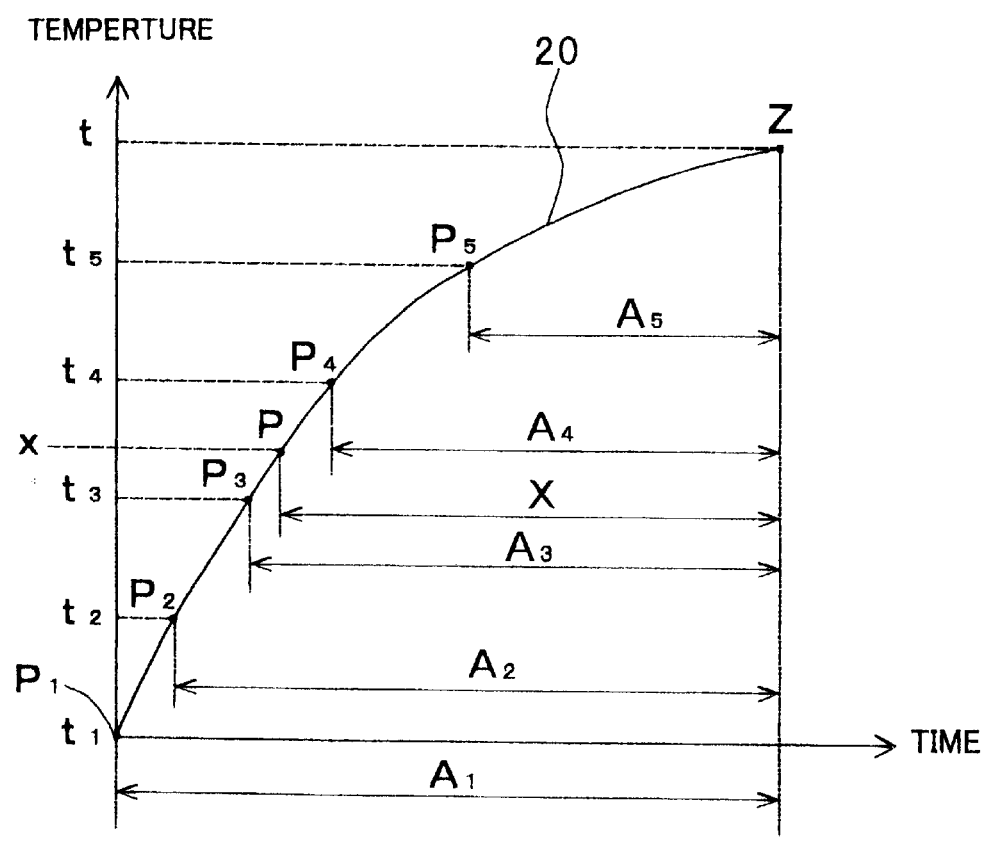
FIG. 5 is a diagram showing conversion data obtained by the test operation shown in FIG. 4 and used to calculate the amount of heating required to heat articles to be brazed to a given temperature.

FIG. 5 is a graph showing an example of the conversion data.

In the graph, the horizontal axis shows the time and the vertical axis shows the temperature. For example, suppose that, in the test operation, the first set of articles to be brazed is introduced into the heating process at a temperature $t_1$, substantially without being preheated. It is assumed that the temperature suitable for brazing is "t" in this case. When the operator monitoring the temperature of the articles to be brazed judges that they have reached this temperature, then the operator operates the switch to drive the wire cylinders. When the time taken from when the filler metal supply nozzle wait timer is started to when this switch is operated is taken as $A_1$, then this set of articles to be brazed corresponds to the point $P_1$ shown in the diagram.

Next, suppose that the second set of articles to be brazed is preheated, and that their temperature measured before the heating process is $t_2$ and the time taken until the switch is operated is $A_2$, in which case this set of articles to be brazed corresponds to the point $P_2$. When it is similarly assumed that the third set of articles to be brazed corresponds to the point $P_3$, the fourth set corresponds to the point $P_4$, and the fifth set corresponds to the point $P_5$, and then the curve 20 connecting these points and the position Z showing the final temperature suitable for brazing is obtained as the conversion data. The curve thus obtained is conversion data for the heating amount calculating means which can be applied to all sets of articles of this same combination of shapes and materials. Then an approximate expression, a conversion table, or the like, is obtained from this curve and stored in the storage unit 57.

Such conversion data can be similarly obtained and stored with sets of articles of other shapes and other materials. Also, when the atmospheric temperature considerably varies between different seasons, e.g. in summer and winter, and the temperature therefore rises differently even with a heating burner providing the same amount of heating, similar conversion data can be obtained for the respective atmospheric temperature conditions to enable more precise control of heating.

Figure 6:
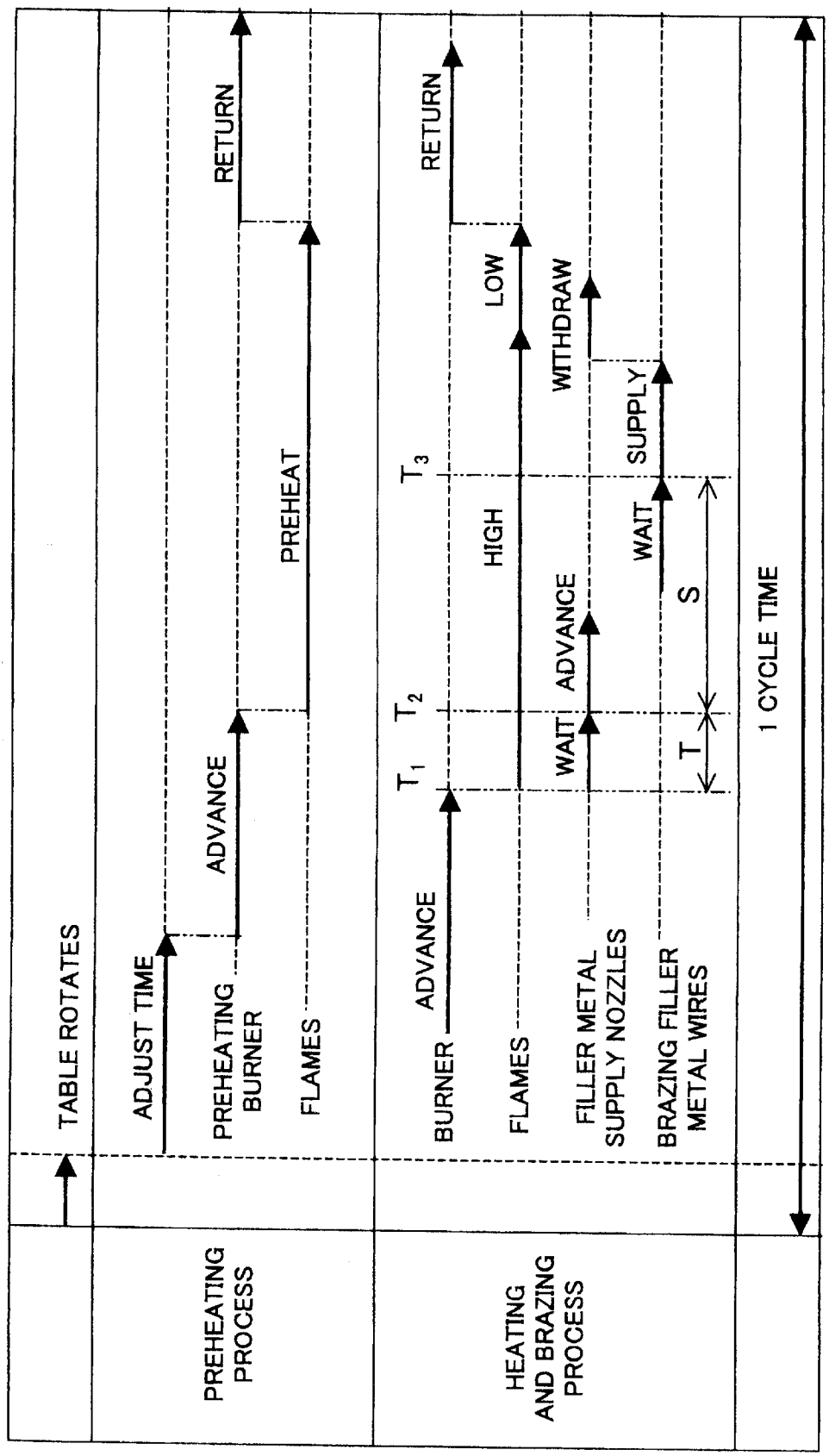
FIG. 6 is a time chart showing operations in one cycle time of the preheating process and the heating and brazing process with the brazing apparatus of the first embodiment of the invention.

FIG. 6 is a time chart showing the operations in the preheating process and the heating and brazing process in one cycle time in the brazing apparatus of the first embodiment of the invention.

Referring to the diagram, in the heating and brazing process, the point $T_1$ corresponds to the beginning of the wait state of the brazing filler metal supply nozzles which are driven by the brazing filler metal wire cylinders, and the point $T_2$ corresponds to the beginning of the forward movement of the brazing filler metal supply nozzles, and then the point of time at which the switch is operated in the step S23 of FIG. 4 corresponds to the point $T_2$. Also, since the filler metal supply nozzle wait timer starts at the point $T_1$, the time counted by the timer and stored in the step S23 corresponds to the time period T in FIG. 6. The time period S, from the point of time at which the brazing filler metal supply nozzles start moving to the point of time $T_3$ at which the supply of the brazing filler metal wires starts, is set as a constant time in individual apparatuses. Therefore defining the time T substantially determines the time between the beginning of the high flames of the heating burner and the beginning of the supply of the brazing filler metal wires.

Figure 7:
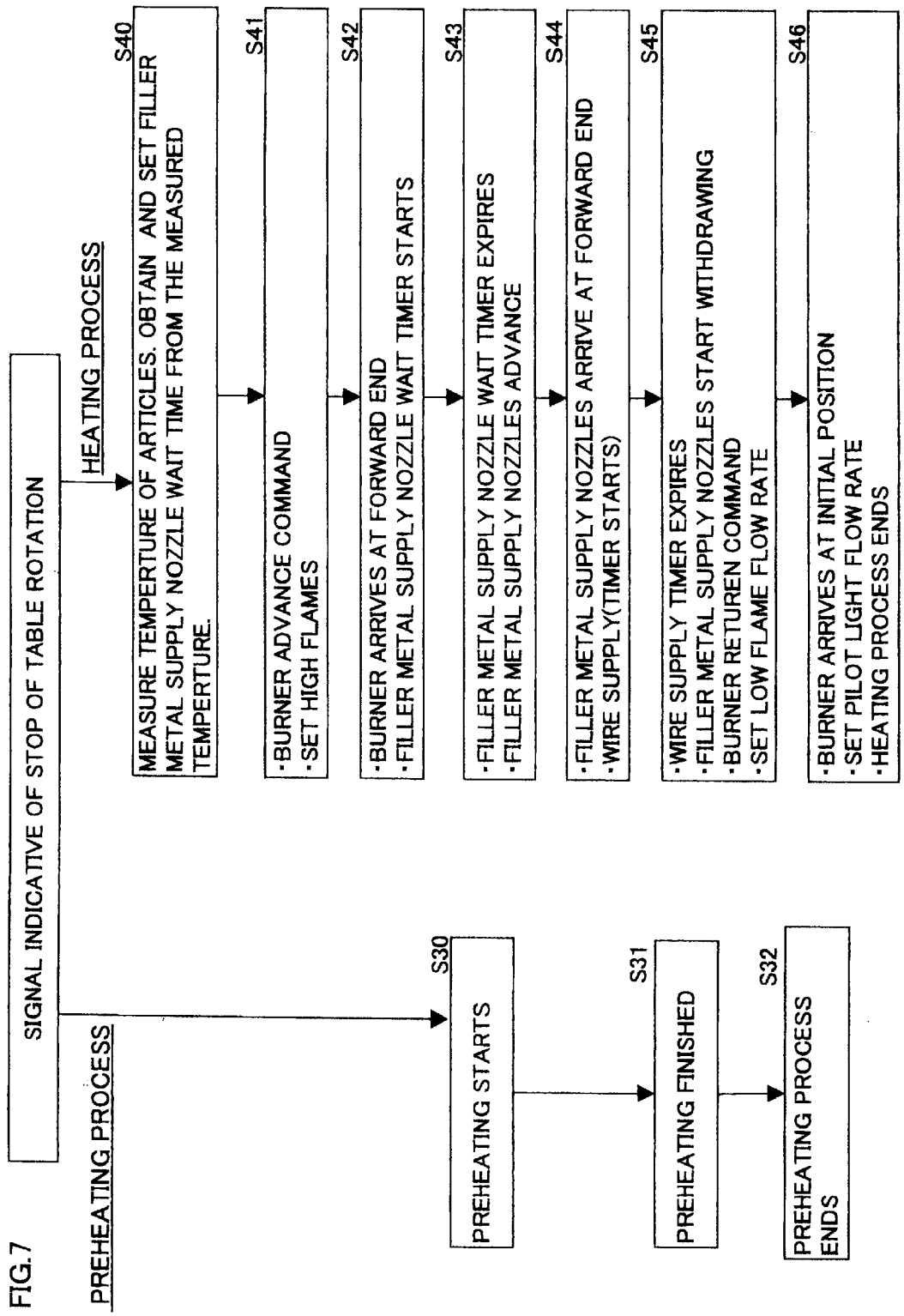
FIG. 7 is a flowchart showing the process of normal operation with the brazing apparatus of the first embodiment of the invention.

FIG. 7 is a flowchart showing the process of normal operation controlled on the basis of the data obtained by the test operation.

Referring to the diagram, in the preheating process, the preheating is started in the step S30 and finished in the step S31, and the preheating process thus ends (S32). In this preheating process, no particular control is required, and the articles are preheated for a given time period by the preheating burner 39 with a constant amount of heating, regardless of conditions such as the atmospheric temperature of the apparatus etc.

Next, in the heating process, the temperature sensor 30 measures the temperature of the articles to be brazed which have been preheated to some increased temperature. When this temperature is taken as x, then this set of articles to be brazed corresponds to the intersection P of the curve 20 and the temperature x in FIG. 5. When this point P has been thus determined, the time X required to attain the temperature suitable for brazing, t, can be calculated on the basis of the curve 20. The time for which the brazing filler metal supply nozzles are kept in the wait state, T, can be set in this way (S40).

Next, in the step S41, the heating burner is directed to move forward and set to "high" flames. When the burner has arrived at the forward end in the step S42, the filler metal supply nozzle wait timer is started. When this timer has counted the time T set in the step S40 and expired, the brazing filler metal supply nozzles start moving forward (S43).

When the brazing filler metal supply nozzles have moved to the forward end, the wires are supplied (S44), and when the wire supply timer has expired, the brazing filler metal supply nozzles start withdrawing and the heating burner is set to the "low" flames and directed to return to the initial position (S45). When the heating burner has returned to the initial position in the step S46, then the flames are placed in the pilot light state and the heating process ends.

As explained so far, the temperature of each set of articles to be brazed together is measured prior to the heating and the timing for initiating the forward movement of the brazing filler metal supply nozzles is automatically set on the basis of the conversion data shown in FIG. 5 to control the brazing. Therefore, the articles to be brazed are always at a prescribed temperature at the time when the brazing filler metal wires are supplied, which prevents deterioration of the brazing quality. Furthermore, the timing corresponds to the time at which the temperature suitable for brazing is reached, which prevents excessive heating and thus appropriately shortens the time required for brazing. Unnecessary heating with the heating burner is thus prevented to avoid wasteful consumption of the combustible gas etc. supplied to the heating burner.

When brazing articles of other shapes, materials, etc., data corresponding to these articles is read from the storage unit 57 to appropriately control the brazing timing.

While, in the embodiment shown above, five sets of articles to be brazed are used to obtain the curve 20 shown in FIG. 5, the number of sets of the brazed articles is not limited to five. A minimum number of sets of articles necessary to define the curve with an approximate expression may be used. In this respect, needless to say, using a larger number of sets of articles to be brazed enables more accurate control.

While the embodiment above has shown a brazing apparatus using a preheating process, the idea of measuring the temperature of the articles to be brazed prior to the heating and controlling the heating on the basis of this temperature can be similarly applied also to brazing apparatuses using no preheating process.

Moreover, while the embodiment above has shown a process in which the heating is controlled by adjusting the heating time, with the heating burner providing a constant heating power, the heating may be controlled by adjusting the heating power, or both the heating power and the heating time, so that the articles to be brazed timely attain a prescribed temperature. This can be achieved by obtaining and storing data which enables calculation of the amount of heating required to heat the articles to the prescribed temperature, on the basis of the conversion data obtained by the test operation.

While the invention has been described in detail, the foregoing description is in all aspects illustrative and not restrictive. It is understood that numerous other modifications and variations can be devised without departing from the scope of the invention.

What is claimed is:

1. A brazing apparatus comprising:

detecting means for detecting a temperature of articles to be brazed;

heating means for heating the articles with a burner;

control means, including calculating means which calculates an amount of heating required to heat the articles to a prescribed temperature on the basis of the detected temperature, for controlling said heating means on the basis of the calculated amount of heating so as to heat the articles to the prescribed temperature to obtain prescribed-temperature-heated articles; and brazing means for brazing the prescribed-temperature-heated articles.

2. The brazing apparatus according to claim 1, further comprising:

preheating means for preheating said articles to be brazed, wherein said detecting means detects the temperature of said preheated articles and said heating means heats said preheated articles.

3. The brazing apparatus according claim 2, wherein conversion data is obtained through a test operation, the test operation including preparing a plurality of sets of the articles to be brazed, which correspond to the same combination of the articles, including a first article of a first shape and a first material, and a second article of a second shape and a second material; sequentially preheating the sets of the articles to be brazed by said preheating means to different temperatures; detecting the different temperatures by said detecting means; measuring heating times required to heat the sets of the articles to be brazed by said heating means to the prescribed temperature from the different temperatures; and obtaining data, defined by the detected temperatures and the heating times, as the conversion data, wherein, in normal operation, the calculating means calculates the amount of the heating from the detected temperature of the articles to be brazed based on the conversion data.

4. The brazing apparatus according to claim 3, wherein the conversion data includes an approximate expression or a conversion table.

5. The brazing apparatus according to claim 1, wherein the detecting mean detects the temperature of the articles at a temperature detection time, wherein the burner of the heating means produces a flame, and wherein the control means sets the flame of the burner at a high level, so as to begin heating the articles from the detected temperature to the prescribed temperature, at a heating time that occurs after the temperature detection time.

6. The brazing apparatus according to claim 5, further comprising means for preheating the articles before the temperature detection time.

* * * * *